(12) United States Patent
Bhavsar et al.

(10) Patent No.: US 10,317,272 B2
(45) Date of Patent: Jun. 11, 2019

(54) AUTOMATIC WIRELESS WAGON DETECTION APPARATUS AND METHOD

(71) Applicant: Deere & Company, Moline, IL (US)

(72) Inventors: Mehul P. Bhavsar, Pune (IN); John A. Dighton, Thibodaux, LA (US)

(73) Assignee: DEERE & COMPANY, Moline, IL (US)

(*) Notice: Subject to any disclaimer, the term of this patent is extended or adjusted under 35 U.S.C. 154(b) by 52 days.

(21) Appl. No.: 15/597,703

(22) Filed: May 17, 2017

(65) Prior Publication Data

US 2018/0335335 A1 Nov. 22, 2018

(51) Int. Cl.
*G01G 19/08* (2006.01)
*G01G 23/01* (2006.01)
*A01D 41/127* (2006.01)
*A01D 90/02* (2006.01)

(52) U.S. Cl.
CPC ............ *G01G 19/08* (2013.01); *A01D 41/127* (2013.01); *A01D 90/02* (2013.01); *G01G 23/01* (2013.01)

(58) Field of Classification Search
USPC .......................................... 73/1.13
See application file for complete search history.

(56) References Cited

U.S. PATENT DOCUMENTS

| | | | |
|---|---|---|---|
| 6,587,772 B2 * | 7/2003 | Behnke | A01D 43/073 460/1 |
| 7,073,314 B2 | 7/2006 | Beck et al. | |
| 7,650,734 B2 | 1/2010 | Beck et al. | |
| 8,280,595 B2 * | 10/2012 | Foster | H04W 4/70 701/50 |
| 9,788,485 B2 * | 10/2017 | Craig | A01D 41/1271 |
| 9,983,311 B2 * | 5/2018 | McPeek | G01N 33/0098 |
| 2004/0015477 A1 * | 1/2004 | Beck | A01B 79/005 |
| 2006/0047418 A1 * | 3/2006 | Metzler | A01B 69/007 701/469 |
| 2006/0150584 A1 * | 7/2006 | Weiss | A01B 69/008 54/10 |
| 2015/0124054 A1 * | 5/2015 | Darr | G01F 25/0084 348/46 |

FOREIGN PATENT DOCUMENTS

WO 2015048499 4/2015

* cited by examiner

*Primary Examiner* — Clayton E. LaBalle
*Assistant Examiner* — Warren K Fenwick
(74) *Attorney, Agent, or Firm* — Michael Best & Friedrich LLP (57) ABSTRACT

A harvesting system includes a crop unloading machine having a volume measurement device configured to measure a volume of harvested crops, and a crop transport vehicle including a weight sensor configured to sense a weight of the harvested crops. The crop transport vehicle can receive crops from the crop unloading machine. The crop transport vehicle communicates the sensed weight to the crop unloading machine and the crop unloading machine calculates a crop yield based upon the sensed weight, the volume and a state of the crop unloading machine.

20 Claims, 4 Drawing Sheets

AUTOMATIC WIRELESS WAGON DETECTION APPARATUS AND METHOD

BACKGROUND

The present disclosure relates to vehicles used for harvesting.

SUMMARY

An automatic wireless wagon detection apparatus and method includes an algorithm that enables a crop unloading machine (CUM) to detect runtime and to detect if it is filling crop in a scale-equipped crop transport vehicle (CTV) or a non-scale-equipped CTV using pattern recognition, without human intervention. After it detects runtime, different automation functions can be achieved by the CUM (e.g., automated yield calibration, displaying of data, mapping, prescription, etc.).

This algorithm can be used by any two-machine systems used for crop unloading (vehicle, implement, harvester, combine, etc.) that unload to a scale equipped CTV (high dump cart, wagon, haul out, etc.) linked by any wireless device.

Yield calibration is very important for yield monitoring and mapping systems. Whole system accuracy depends on accurate and periodic yield calibration. Currently this calibration process is manual. With the algorithm and wireless communication on the CUM and CTV in the present application, the CUM can automatically detect the duration of time that the CUM is turned on (e.g., the runtime). In some embodiments, a first CTV includes a scale and a second CTV does not include a scale. The measured weight of the first CTV can be utilized to calibrate the mass flow sensor on the first CUM, and thus the yield of the first CTV. The yield of the second CTV can be estimated based upon the calibration of the mass flow sensor of the first CUM and the measurement of the mass flow sensor on the first CUM when the first CUM is filling the second CTV.

In some embodiments, the application provides a method of measuring and calculating crop yield. The method includes sending a signal via a transceiver from a crop transport vehicle to a crop unloading machine, receiving the signal with a transceiver on the crop unloading machine to detect the presence of the crop transport vehicle and harvesting a crop with the crop unloading machine, and measuring a volume of the harvested crop with a sensor in the crop unloading machine. The method further includes transferring the harvested crop from the crop unloading machine into the crop transport vehicle, measuring the weight of the harvested crop with a sensor in the crop transport vehicle, and communicating the measured weight with the crop unloading machine. The method further includes determining the status of the crop unloading machine, and calculating, with a controller, the crop yield based upon the measured weight, the measured volume, and the state of the crop unloading machine.

In some embodiments, the application provides a harvesting system including a crop unloading machine including a volume measurement device that can measure a volume, and a crop transport vehicle including a weight sensor, the crop transport vehicle that can receive crops from the crop unloading machine. The crop transport vehicle can communicate the sensed weight to the crop unloading machine, and the crop unloading machine can calculate a crop yield based upon the sensed weight, the volume and a state of the crop unloading machine.

In some embodiments, the application provides a harvesting system including a first crop unloading machine having a first volume measurement device that can measure a first volume and a second crop unloading machine having a second volume measurement device that can measure a second volume. The harvesting system further includes a first crop transport vehicle including a weight sensor that can receive crops from the first and second crop unloading machines, and a second crop transport vehicle that can receive crops from the first and second crop unloading machines. The first crop transport vehicle can communicate the sensed weight to the first crop unloading machine and to the second crop unloading machine. When the first crop unloading machine is filling the first crop transport vehicle, the first crop unloading machine can calculate a first crop yield based upon the sensed weight, the first volume and a state of the first crop unloading machine. When the second crop unloading machine is filling the second crop transport vehicle, the second crop unloading machine can monitor the second volume and a state of the second crop unloading machine.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings, and the terms "connected" and "coupled" and variations thereof are not restricted to physical or mechanical connections or couplings. Also, it is to be understood that phraseology and terminology used herein with reference to device or element orientation (such as, for example, terms like "front", "back", "up", "down", "top", "bottom", and the like) are only used to simplify description of the present disclosure, and do not alone indicate or imply that the device or element referred to must have a particular orientation. In addition, terms such as "first", "second", and "third" are used herein and in the appended claims for purposes of description and are not intended to indicate or imply relative importance or significance.

In one embodiment a CUM in the form of a sugarcane harvester and a CTV in the form of a wagon are linked through radio frequency (RF) communication. Sugarcane crops may be harvested up to three times before a new crop needs to be planted. It is important that sugarcane crops are harvested at specific temperatures and seasons to ensure that the crop will continue to produce for all three harvests. One of the ways that this is ensured is by analyzing the crop yield.

Crop yield is conventionally calculated by manually weighing wagons that are full of crops and comparing the weight data to the measured volume of crop harvested by the harvester. Then the crop weight per harvested volume is utilized to estimate the crop weight for a future harvested volume. When other wagons are full of crops, these wagons are weighed and the weight is compared to the measured volume. The measured weight and harvested volume are utilized to calibrate the volume measurement device of the harvesters. When the volume measurement devices of the harvesters are calibrated, the weight of the associated wagons can be estimated. The weight of the wagons is determined manually after the wagons are full. The measured weight(s) of the wagons is utilized to further calibrate the volume measurement devices. Previously, the weight of the wagons was only measured after the wagons were full and finished harvesting the crops. Therefore, calibration of the volume measurement devices was slow and the data used was often many hours old. The crop weight yield per harvested volume can change dramatically over different portions of a field. For example, portions near sprinklers likely yield a heavier crop (with greater weight per volume), whereas portions farther from sprinklers likely yield a lighter crop (with less weight per volume). Because the calibration is conducted after a wagon is full, the calibration data may not be accurate for subsequent wagons harvesting crops from different portions of the field. Further, crop moisture may evaporate more quickly from a harvested crop than it does from an unharvested crop. Therefore, the weight of the crop may decrease after harvesting because the moisture evaporates. Thus, the older the data is, the less accurate it may be.

Figure 1:
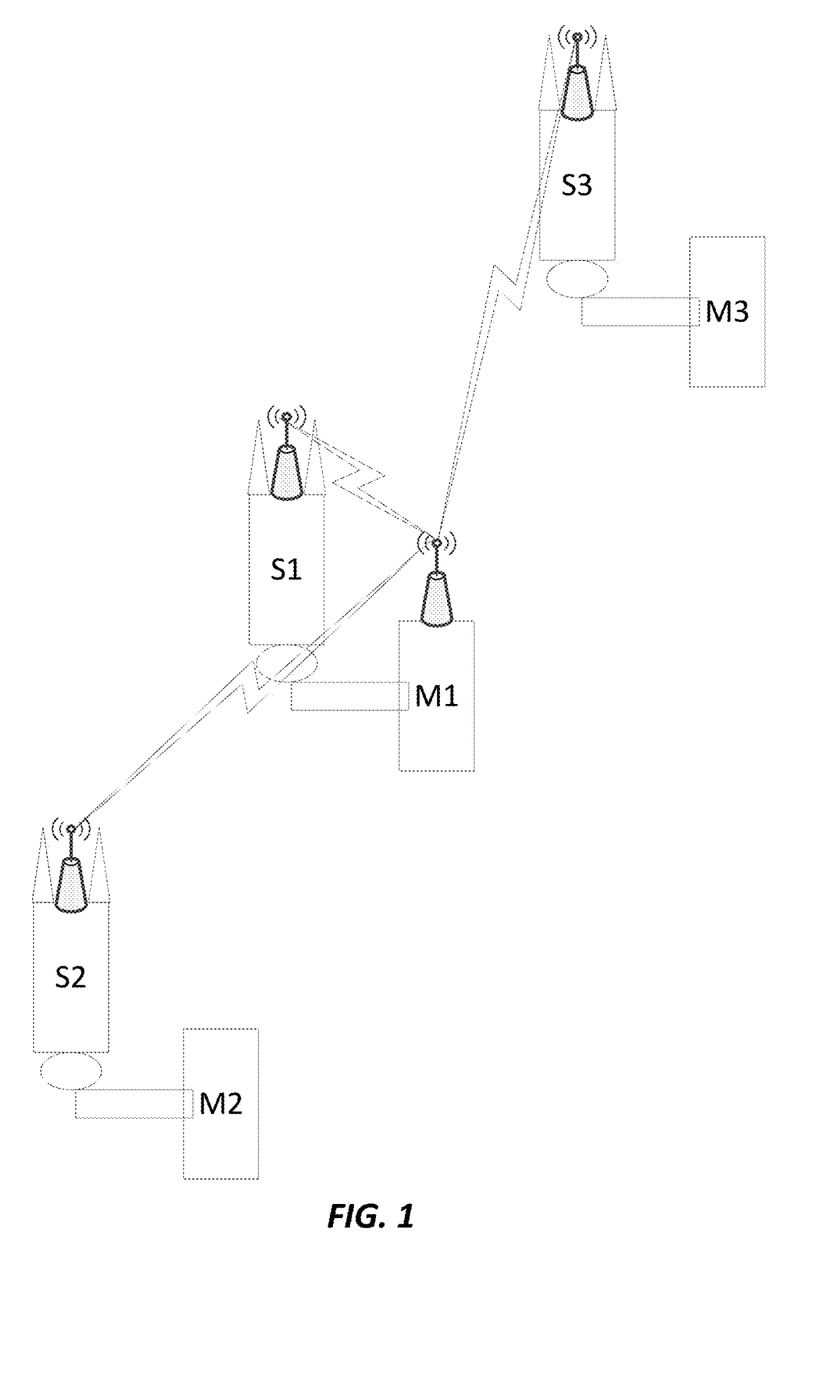
FIG. 1 is a schematic view of one embodiment of crop transporting vehicles and crop unloading machines.

One example is illustrated in FIG. 1, which includes first, second and third harvesters S1, S2 and S3, respectively and first, second and third wagons M1, M2 and M3, respectively. In some embodiments, more than three harvesters and wagons are utilized. In the illustrated embodiment, the first wagon M1 is a scaled wagon equipped with a RF transceiver which transmits its scale data (crop weight) to the first, second and third harvesters S1, S2 and S3 equipped with RF transceivers as shown in FIG. 1.

In the illustrated embodiment, the first wagon M1 measures a weight of harvested crop and transmits the measured weight to the first, second and third harvesters S1, S2 and S3. Each of the first, second and third harvesters S1, S2 and S3 has a sensor, such as a volume measurement device, that measures the volume of crop harvested by the respective harvester S1, S2 and S3. The wagons M1, M2 and M3 are each filled by the harvesters S1, S2 and S3 at various times during harvesting. As described in detail below, the volume measurement devices of the first, second and third harvesters S1, S2, S3 are calibrated based upon the measured volume of the respective harvester S1, S2 or S3, the runtimes of the respective harvester S1, S2, S3, and the measured weight of the first wagon M1 when the respective harvester S1, S2 or S3 is filling the first wagon M1. This calibration is used to estimate the yield of the harvesters S1, S2, S3 when filling the wagons without a weight sensor (such as the second and third wagons M2 and M3). While the illustrated embodiment includes volume-based yield monitors, in some embodiments, other yield monitors are utilized in addition to or in lieu of the illustrated volume-based yield monitors.

In the illustrated embodiment, the second and third wagons M2 and M3 do not include weight sensors. In other embodiments, additional wagons (fourth, fifth, etc.) can be positioned near the side of respective additional harvesters that are configured to receive weight data from the first wagon M1. These additional wagons (fourth, fifth, etc.) do not need to include weight sensors if the respective harvesters receive weight data from the first wagon M1. Further, additional wagons can be utilized with the first, second and third harvesters S1, S2 and S3 such that each of the harvesters S1, S2 and S3 is filling respective wagons (for example, M1, M2 and M3), while other wagons (for example, M4, M5 and M6, not shown) that have been filled are traveling to the weigh station to be weighed and still other wagons (for example, M7, M8 and M9, not shown) have been weighed and emptied and are traveling back to the harvesters S1, S2 and S3. Only the first wagon M1 includes a weight sensor such that the first wagon M1 can be filled by any of the harvesters S1, S2 and S3, and utilized to calibrate the yield, as described in greater detail below. When the harvesters S1, S2 and S3 are filling any of the other wagons (such as any of M2 through M9), the yield data that was calculated while the respective harvester S1, S2 and S3 was paired with the first wagon M1 is utilized to estimate yield calibration of the respective harvesters S1, S2 and S3 while filling the other wagons (such as M2 through M9).

Figure 2:
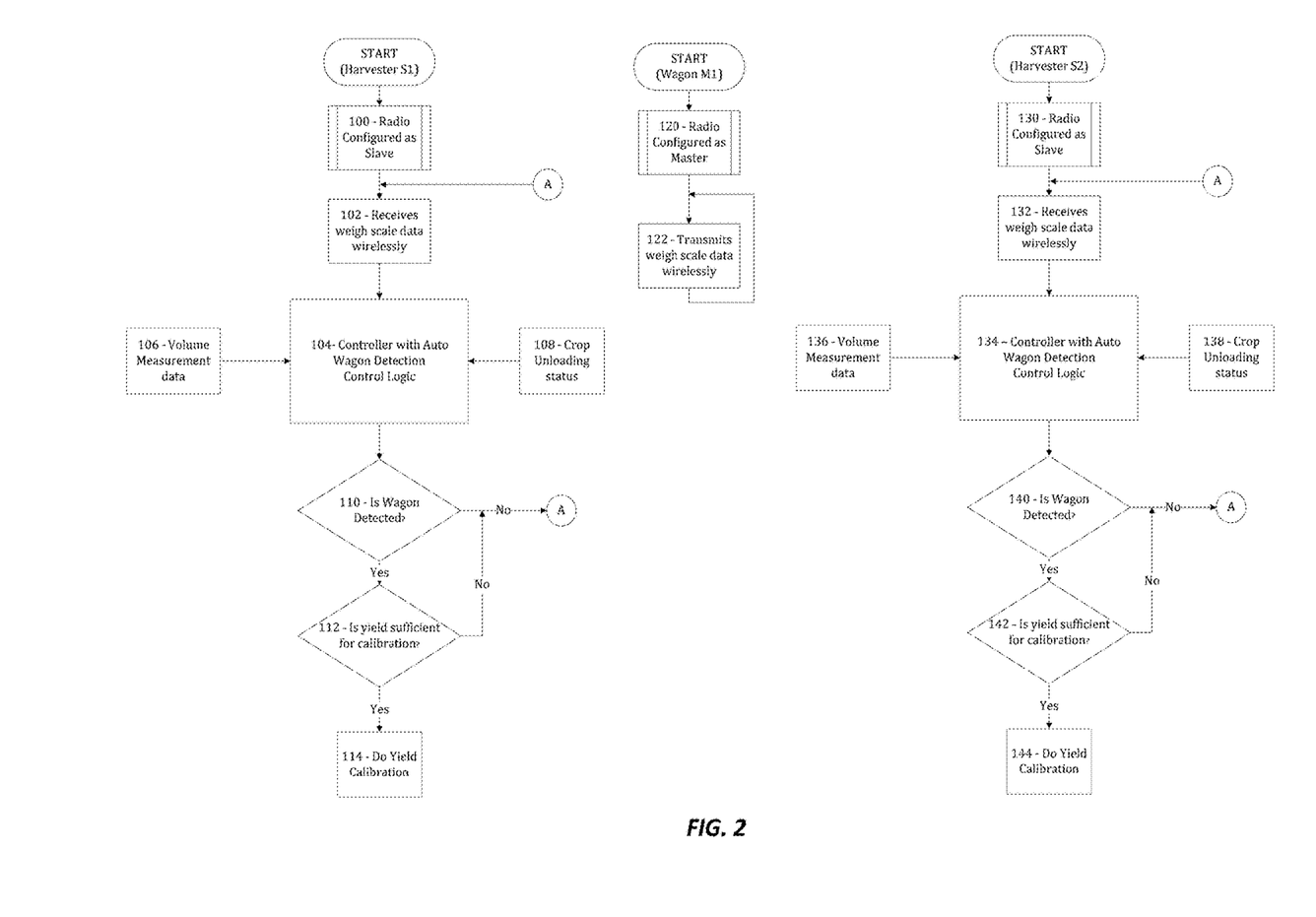
FIG. 2 is a flowchart illustrating the operating procedure for communication between the crop transporting vehicles and the crop unloading machines.

FIG. 2 is a flowchart illustrating the operating procedure for communication between the first harvester S1, the first wagon M1, and the second harvester S2. While not specifically shown, the operation of the third harvester S3 corresponds to the operation of the second harvester S2. Operation of the first harvester S1 includes configuring the radio as a slave at step 100 and receiving weight scale data wirelessly from the first wagon M1 at step 102 (explained in detail below with respect to FIG. 3). Then a controller 104 receives volume data from a crop unloading volume measurement device at step 106 in a first harvester S1 and receives a crop unloading status from the first harvester S1 at step 108 and inputs the volume data and the crop unloading status into the auto wagon detection control logic of the first harvester S1. The first harvester S1 attempts to detect the first wagon M1 at step 110. If the first wagon M1 is detected, the first harvester S1 checks if the crop yield is sufficient for calibration at step 112. If the first wagon M1 is not detected, or if the crop yield is not sufficient for calibration, the first harvester S1 returns to step 102 and attempts to receive weight scale data from the first wagon M1. If the crop yield data is sufficient for calibration, the first harvester S1 conducts yield calibration at step 114.

In the embodiment of FIG. 2, the first wagon M1 configures the radio as a master at step 120 and transmits weigh scale data wirelessly at step 122. Operation of the second harvester S2 corresponds to operation of the first harvester S1. Specifically, operation of the second harvester S2 includes configuring the radio as a slave at step 130 and receiving weigh scale data wirelessly from the first wagon M1 at step 132 (explained in detail in FIG. 3 below). Then a controller 134 receives volume measurement data from a crop unloading measurement device in a second harvester S2 at step 136 and receives a crop unloading status from the second harvester S2 at step 138 and inputs the volume data and the crop unloading status into the auto wagon detection control logic of the second harvester S2. The second harvester S2 attempts to detect the first wagon M1 at step 140. If the first wagon M1 is detected, the second harvester S2 checks if the crop yield is sufficient for calibration at step 142. If the wagon M1 is not detected or if the crop yield is not sufficient for calibration, the second harvester S2 returns to step 132 and attempts to receive weigh scale data from the first wagon M1. If the crop yield data is sufficient for calibration, the second harvester S2 conducts yield calibration at step 144.

If the auto wagon detection logic in the second harvester S2 determines that it is not connected to the first wagon M1, based on the crop unloading status, the crop unloading volume and the weigh scale data received from the first wagon M1, the determination is made that the second harvester S2 is not connected to the first wagon M1, and thus, the second harvester S2 will not calibrate the yield. However, during the operation if the scale equipped first wagon M1 moves to the second harvester S2 and the second harvester S2 begins unloading the crop into the first wagon M1, then the second harvester S2 determines (for example, by auto wagon detection logic) that the second harvester S2 is connected to the first wagon M1 and calibrates the yield if the yield is sufficient for calibration.

Figure 3:
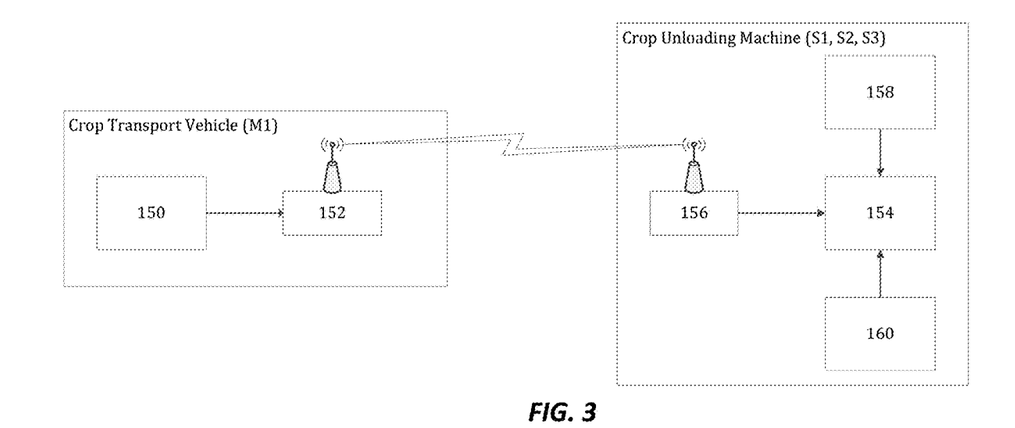
FIG. 3 is a schematic of the hardware included in the crop transporting vehicles and the crop unloading machines.

FIG. 3 illustrates a crop transport vehicle (CTV), such as the scale-equipped first wagon M1, which includes a crop weigh scale measurement device 150 that measures weight and transmits data to an interfaced wireless transceiver 152 which broadcasts the data. FIG. 3 also illustrates a crop unloading machine (CUM), such as any of the first, second and third harvesters S1, S2 and S3, which includes a controller 154, and a wireless transceiver 156 that is in communication with the controller 154 and with the wireless transceiver 152 of the CTV. The measured weight from the crop weigh scale measurement device 150 is transmitted from the CTV wireless transceiver 152 to the CUM transceiver 156 and then to the controller 154. The controller 154 is also in communication with a crop unloading volume measurement device 158 that detects the volume of crop that is unloaded by the CUM, and a crop unloading state detector 160 which detects the state of the CUM (described in detail below). Based on the measured weight, the measured volume, and the detected state, the controller 154 runs an algorithm (described in detail below regarding FIG. 4) for the scale-equipped CTV detection.

In some embodiments, the first, second and third harvesters S1, S2 and S3 receive the weight data from the first wagon M1 and the identification from the respective wagon M1, M2 and M3. In other embodiments, only the first wagon M1 communicates with the first, second and third harvesters S1, S2 and S3. The crop unloading state is also utilized to measure the crop yield. In the past, a global positioning system (GPS) was utilized to track the location of the harvesters and wagons. However, a GPS is not necessary with the present system.

Further, the first wagon M1 transmits the measured weight, but does not receive any data from the harvesters S1, S2 or S3. In the illustrated embodiment, the second and third wagons M2 and M3 do not transmit any data to or receive any data from the harvesters S1, S2 or S3. In the past, two-way communications occurred between each of the wagons and the harvesters. In some embodiments, none of the first, second and third wagons M1, M2, M3 include an intelligent controller. Rather, at least one of the first, second and third wagons M1, M2, M3 includes a transceiver to communicate with the respective harvester S1, S2, S3. The transceivers on the respective at least one of the first, second and third wagons M1, M2, M3 are equipped for one-way communication with the respective harvester S1, S2, S3.

Based on the received data from the scale equipped first wagon M1, the harvester's operation state, and measured volume of harvested crop, an algorithm (see FIG. 4) operates in each harvester controller to detect whether that harvester is filling the scale-equipped first wagon M1 or not.

Figure 4:
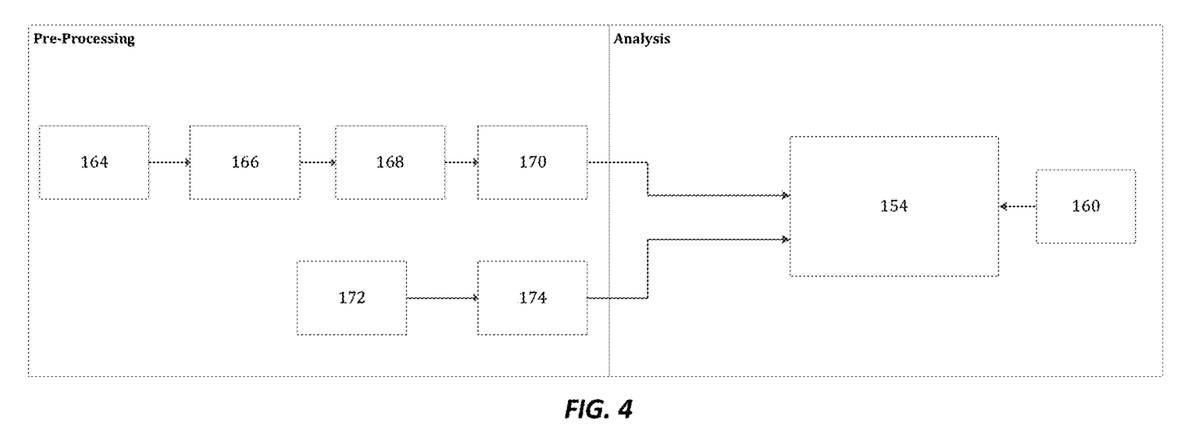
FIG. 4 illustrates a flow schematic of an automatic wagon detection algorithm.

FIG. 4 illustrates one embodiment of an automatic wagon detection (AWD) algorithm. In the illustrated embodiment, the weight data 164 is received from the crop weigh scale measurement device 150 via the transceiver 152 of the scale-equipped first wagon M1 and is sent through a data parsing and validation step 166 that parses the required data from the message sent from the scale equipped CTV and validates the data using a data validity algorithm. The weight data is then filtered at step 168 to account for variations in the weight data before it is analyzed. The weight slope is then calculated at step 170 to detect incremental changes in weight over time. The measured volume data 172 from the crop unloading volume measurement device 158 is utilized to calculate the volume slope at step 174 to detect incremental changes in the measured volume data over time. Both the weight slope and the volume slope are communicated to the controller 154 of the appropriate crop unloading machine (such as one of the harvesters S1, S2, S3). The crop unloading state detector 160 communicates with the controller 154 of the respective one of the harvesters S1, S2, S3. The slope calculations at steps 170, 174 are utilized to determine the crop yield and calibrate when sufficient data is provided to calibrate the yield.

For example (as per FIG. 1), the disclosed algorithm of FIG. 4 will operate in the controllers of the second and third harvesters S2 and S3 and receive weight data from the first wagon M1, but they are filling the crop in the second and third wagons M2 and M3 respectively, so they will detect that they are not filling the scale equipped first wagon M1 with harvested crops and thus, will not calibrate the yield. The first harvester S1 (running the algorithm of FIG. 4) will detect that it is filling the scale equipped first wagon M1 with harvested crops and will calibrate the volume measurement device of the first harvester S1. The first harvester S1 will also detect if the first wagon M1 is moved to replace the second wagon M2 (for example, if the weight measurement data from the first wagon M1 indicates that the weight of the first wagon M1 is increasing while the first harvester S1 is not harvesting crops) and will then break the detection, thereby stopping future calibrations until the first wagon M1 returns to the side of the first harvester S1. This network topology works with one master (scale equipped first wagon M1) and all other slaves (first, second and third harvesters S1, S2 and S3). If there is more than one master (scale wagon) then a nuclear cluster of master-slaves can be utilized.

Figure 5:
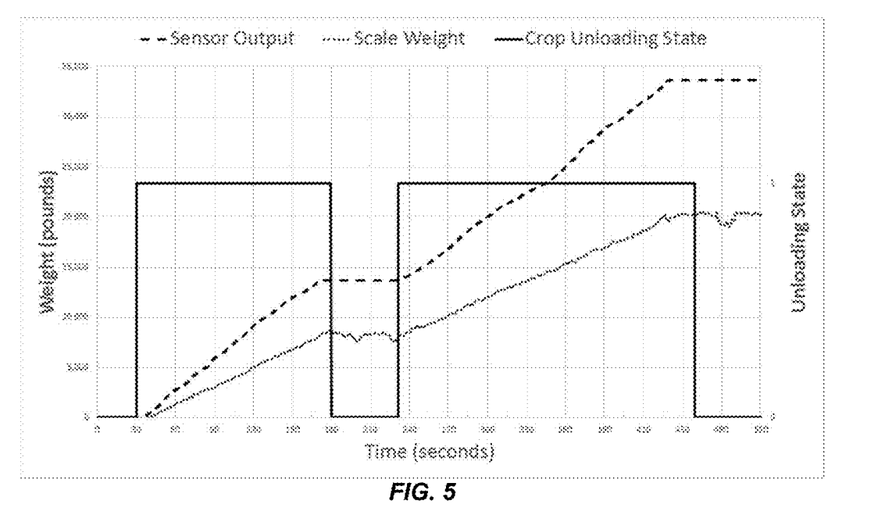
FIG. 5 is a graph illustrating sensor, weight and crop unloading state during operation.

FIG. 5 is a graph illustrating one embodiment of a controller on the first harvester S1 receiving data from the first wagon M1. The horizontal axis is time measured in seconds and the vertical axis is pounds. The controller receives sensor output from the crop unloading volume measurement device on the first harvester S1 and a measured scale weight from the scale-equipped first wagon M1 and graphs the received data. In some embodiments, the sensor output is a volume of the harvested crops. The controller also receives a crop unloading state from the first harvester S1 which is shown as either ON (at 1) or OFF (at 0) in FIG. 5. As shown in FIG. 5, the sensor output and weight increase steadily when the crop unload state is ON, but stay substantially the same when the crop unload state is OFF. This indicates that the first harvester S1 is filling the first wagon M1. In the illustrated embodiment, the slope of the sensor output is slightly steeper than the slope of the measured weight. Some of the variations in weight are due to the precision of the weigh scale measurement device. If the weight and sensor output do not correspond, for example, with sensor output of the second or third harvester S2 or S3 and the measured weight of the first wagon M1, the algorithm will continue running but will not calibrate the yield until the weight and sensor output do correspond to indicate that the second or third harvester S2 or S3 is filling the first wagon M1.

Figure 6:
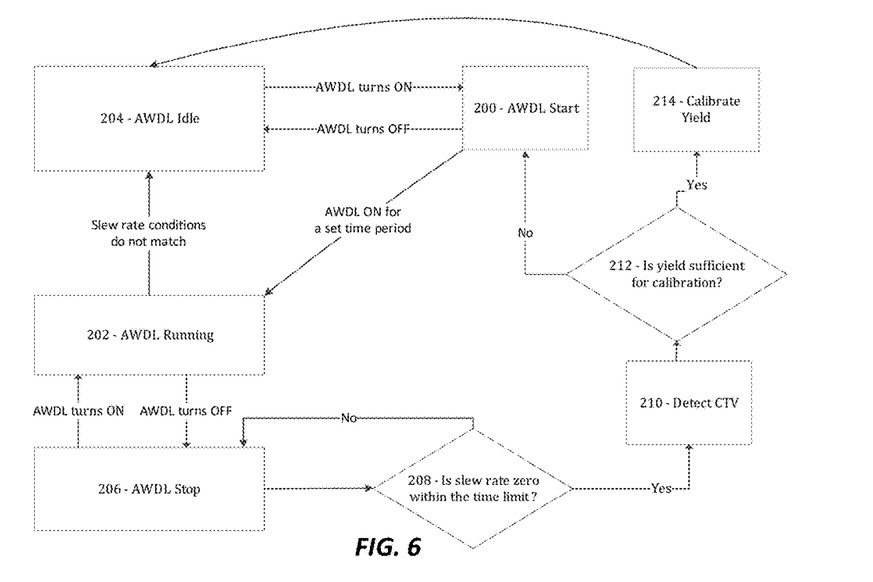
FIG. 6 is a flow diagram of one method of operation of the crop unloading machine.

FIG. 6 illustrates one embodiment of an operating method of the auto wagon detection control logic (AWDL), the steps of which are described below.

When the CUM (such as one of the harvesters S1, S2, S3) is operating, the AWDL is running to automatically detect and calculate yield calibration. When the AWDL is in the start state 200, the automatic weight detector waits for a set time period to stabilize the weigh and sensor output slew data. After stabilization, the automatic weight detector changes to AWDL running state 202.

When the CUM (such as one of the harvesters S1, S2, S3) is operating and the AWDL is running, the automatic weight detector captures the maximum slew rate value. Also, the automatic weight detector monitors the sensor output and weight slew rates to determine if the sensor output and weight slew rates correspond (i.e., as shown in FIG. 5). If the automatic weight detector observes that the sensor output and the weight slew rate do not correspond for a significant amount of time, the automatic weight detector logic changes to the AWDL idle state 204 because the CUM (such as one of the harvesters S1, S2, S3) is not filling the scale-equipped CTV (such as the first wagon M1). If the automatic weight detector determines that the sensor output and weight slew rates do correspond for a significant amount of time, the automatic weight detector logic changes to or remains in the AWDL running state.

After a set time period, the AWDL turns OFF such that the AWDL is in a stop state 206. When in the AWDL stop state 206, the automatic weight detector periodically monitors the sensor output and weight slew rates at 208. The slew rates should reach zero within a pre-defined time to declare that the CUM (such as one of the harvesters S1, S2, S3) is filling the scale-equipped CTV (such as the first wagon M1). When the slew rate reaches zero (or is below a pre-determined threshold), then the automatic weight detector logic moves to the detect CTV state 210. After the pre-defined time elapses, if the slew rate does not drop below a pre-determined threshold, the automatic weight detector logic remains in the AWDL stop state 206.

During the detect CTV state 210, the automatic weight detector determines if sufficient data has been gathered for calibration at 212. If sufficient data has been gathered, the yield is calibrated at step 214. If sufficient data is not gathered, the automatic weight detector goes to the AWDL start state 200, and waits for the AWDL to be in the ON condition for a set time period again. When the AWDL is in the AWDL start state 200, the AWDL running state 202, the idle state 204, the AWDL stop state 204, and the detect CTV state 210, the AWDL utilizes the previously-calculated calibration data until new calibration data is calculated during the calibrate yield step 214.

Various features and advantages of the invention are set forth in the following claims.

What is claimed is:

1. A method of measuring and calculating crop yield, the method including:
    sending a signal via a first transceiver on a crop transport vehicle to a crop unloading machine;
    receiving the signal with a second transceiver on the crop unloading machine to detect a presence of the crop transport vehicle;
    harvesting a crop with the crop unloading machine;
    measuring a volume of the harvested crop with a sensor in the crop unloading machine;
    transferring the harvested crop from the crop unloading machine into the crop transport vehicle;
    measuring a weight of the harvested crop with a sensor in the crop transport vehicle; communicating the measured weight to the crop unloading machine;
    determining a state of the crop unloading machine; and
    calculating, with a controller, a crop yield based upon the measured weight, the measured volume, and the state of the crop unloading machine.

2. The method of claim 1, wherein the crop transport vehicle is a first crop transport vehicle and the crop unloading machine is a first crop unloading machine, and further comprising
    sending the signal via the first transceiver on the first crop transport vehicle to a second crop unloading machine; and
    receiving the signal with a third transceiver on the second crop unloading machine to detect the presence of the first crop transport vehicle.

3. The method of claim 2, further comprising harvesting a second crop with the second crop unloading machine;
    measuring a volume of the second harvested crop with a sensor in the second crop unloading machine; and
    transferring the second harvested crop from the second crop unloading machine into the first or second crop transport vehicle.

4. The method of claim 3, further comprising communicating the measured weight of the harvested crop in the first crop transport vehicle to the second crop unloading machine;
    determining the state of the second crop unloading machine; and
    comparing the measured weight of the harvested crop in the first crop transport vehicle to the measured volume of the second harvested crop and the state of the second crop unloading machine to determine if the second crop unloading machine is filling the first transport vehicle or the second crop transport vehicle.

5. The method of claim 4, wherein if the measured weight of the harvested crop in the first crop transport vehicle corresponds to the measured volume of the second harvested crop and the state of the second crop unloading machine, determining that the second crop unloading machine is filling the first crop transport vehicle, and
    wherein if the measured weight of the harvested crop in the first crop transport vehicle does not correspond to the measured volume of the second harvested crop and the state of the second crop unloading machine, determining that the second crop unloading machine is not filling the first crop transport vehicle.

6. The method of claim 5, wherein if the second crop unloading machine is filling the first crop transport vehicle, further comprising calculating, with a second controller, the crop yield based upon the measured weight of the first harvested crop, the measured volume of the second harvested crop, and the state of the crop unloading machine.

7. The method of claim 6, wherein if the second crop unloading machine is not filling the first crop transport vehicle, further comprising utilizing previously-measured calibration data until the second crop unloading machine determines that it is filling the first crop transport vehicle and new calibration data is calculated.

8. A harvesting system comprising:
a crop unloading machine including a volume measurement device configured to measure a volume of harvested crops; and
a crop transport vehicle including a weight sensor, the crop transport vehicle configured to receive the harvested crops from the crop unloading machine, the weight sensor configured to sense a weight of the harvested crops;
wherein the crop transport vehicle is configured to communicate the sensed weight to the crop unloading machine;
wherein the crop unloading machine is configured to calculate a crop yield based upon the sensed weight, the measured volume, and a state of the crop unloading machine.

9. The harvesting system of claim 8, wherein the crop unloading machine is a first crop unloading machine and wherein the crop transport vehicle is a first crop transport vehicle, and further comprising a second crop unloading machine, a second crop transport vehicle, a third crop unloading machine and a third crop transport vehicle, and
wherein the first crop transport vehicle is configured to communicate the sensed weight of the first crop transport vehicle to the second crop unloading machine and to the third crop unloading machine.

10. The harvesting system of claim 9, wherein the second crop unloading machine includes a second volume measurement device configured to measure a second volume of harvested crops, and wherein the second crop transport vehicle is configured to receive the harvested crops from any of the first, second and third crop unloading machines.

11. The harvesting system of claim 10, wherein the third crop unloading machine includes a third volume measurement device configured to measure a third volume of harvested crops, and wherein the third crop transport vehicle is configured to receive harvested crops from any of the first, second and third crop unloading machines.

12. The harvesting system of claim 11, further comprising comparing the sensed weight of the first crop transport vehicle, the second volume and state of the second crop unloading machine to determine if the second crop unloading machine is filling the first crop transport vehicle, and
comparing the sensed weight of the first crop transport vehicle, the third volume and state of the third crop unloading machine to determine if the third crop unloading machine is filling the first crop transport vehicle.

13. The harvesting system of claim 12, wherein if the sensed weight of the harvested crop in the first crop transport vehicle corresponds to the measured volume of the second harvested crop and the state of the second crop unloading machine, determining that the second crop unloading machine is filling the first crop transport vehicle, and
wherein if the measured weight of the harvested crop in the first crop transport vehicle does not correspond to the measured volume of the second harvested crop and the state of the second crop unloading machine, determining that the second crop unloading machine is not filling the first crop transport vehicle.

14. The harvesting system of claim 13, wherein if the second crop unloading machine is filling the first crop transport vehicle, further comprising calculating, with a second controller, the crop yield based upon the measured weight of the first harvested crop, the measured volume of the second harvested crop, and the state of the second crop unloading machine, and
wherein if the second crop unloading machine is not filling the first crop transport vehicle, further comprising utilizing previously-measured calibration data until the second crop unloading machine determines that it is filling the first crop transport vehicle and new calibration data is calculated.

15. The harvesting system of claim 12, wherein if the measured weight of the harvested crop in the first crop transport vehicle corresponds to the measured volume of the third harvested crop and the state of the third crop unloading machine, determining that the third crop unloading machine is filling the first crop transport vehicle, and
wherein if the measured weight of the harvested crop in the first crop transport vehicle does not correspond to the measured volume of the third harvested crop and the state of the third crop unloading machine, determining that the third crop unloading machine is not filling the first crop transport vehicle.

16. The harvesting system of claim 15, wherein if the third crop unloading machine is filling the first crop transport vehicle, further comprising calculating, with a third controller, the crop yield based upon the measured weight of the first harvested crop, the measured volume of the third harvested crop, and the state of the third crop unloading machine, and
wherein if the third crop unloading machine is not filling the first crop transport vehicle, further comprising utilizing previously-measured calibration data until the third crop unloading machine determines that it is filling the first crop transport vehicle and new calibration data is calculated.

17. A harvesting system comprising:
a first crop unloading machine including a first volume measurement device configured to measure a first volume of harvested crops;
a second crop unloading machine including a second volume measurement device configured to measure a second volume of harvested crops;
a first crop transport vehicle including a weight sensor, the first crop transport vehicle configured to receive the harvested crops from the first and second crop unloading machines, the weight sensor configured to measure a weight of the harvested crops, wherein the first crop transport vehicle is configured to communicate the measured weight to the first crop unloading machine and to the second crop unloading machine;
a second crop transport vehicle, the second crop transport vehicle configured to receive the harvested crops from the first and second crop unloading machines; and
wherein when the first crop unloading machine is filling the first crop transport vehicle, the first crop unloading machine is configured to calculate a first crop yield based upon the sensed weight, the first volume, and a state of the first crop unloading machine; and
wherein when the second crop unloading machine is filling the second crop transport vehicle, the second crop unloading machine is configured to monitor the second volume and a state of the second crop unloading machine.

18. The harvesting system of claim 17, wherein when the second crop unloading machine is filling the first crop transport vehicle, the second crop unloading machine is configured to calculate a second crop yield based upon the sensed weight, the second volume, and the state of the second crop unloading machine, and the first crop unloading machine is configured to monitor the first volume and the state of the first crop unloading machine.

19. The harvesting system of claim 18, further comprising a third crop unloading machine including a third volume measurement device configured to measure a third volume of harvested crops and
   a third crop transport vehicle configured to receive the harvested crops from the first, second and third crop unloading machines,
   wherein the first crop transport vehicle is configured to communicate the sensed weight of the first crop transport vehicle to the third crop unloading machine and wherein the third crop unloading machine is configured to monitor the third volume and a state of the third crop unloading machine.

20. The harvesting system of claim 19, wherein when the third crop unloading machine is filling the first crop transport vehicle, the third crop unloading machine is configured to calculate a third crop yield based upon the sensed weight, the third volume, and the state of the third crop unloading machine, the first crop unloading machine is configured to monitor the first volume and the state of the first crop unloading machine, and the second crop unloading machine is configured to monitor the second volume and the state of the second crop unloading machine.

* * * * *